Nov. 3, 1964  W. J. DURTSCHI  3,154,991
DISC TRIMMING MACHINES
Filed June 7, 1963
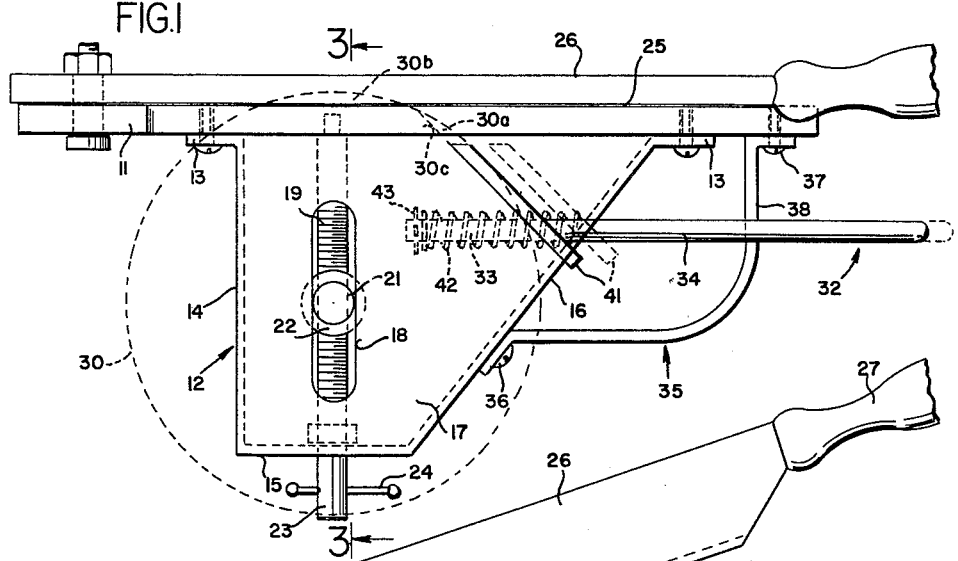
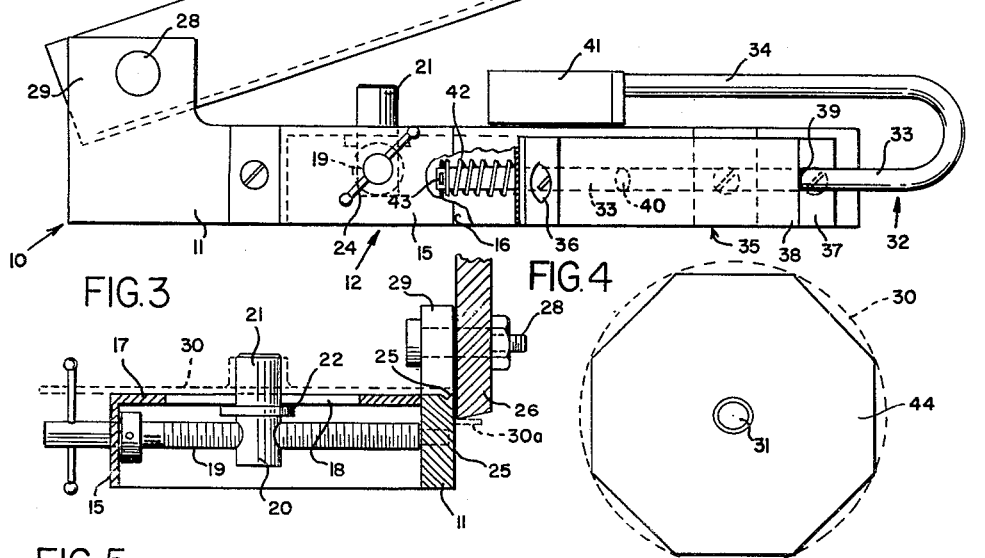
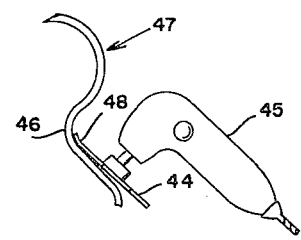
INVENTOR.
WILLIAM J. DURTSCHI
BY J. Ledermann
ATTORNEY

United States Patent Office 3,154,991
Patented Nov. 3, 1964

3,154,991
DISC TRIMMING MACHINES
William J. Durtschi, 231 W. Maple St., Stockton, Ill.
Filed June 7, 1963, Ser. No. 286,403
6 Claims. (Cl. 83—451)

This invention relates to machines or tools for trimming discs, particularly abrasive discs of the type which are used to grind paint or sheet metal in preparation for body refinishing in automobile body repair. The machine may also be used where discs are employed in other trades or applications, such as, for example, in floor sanding, boat refinishing, and others.

A primary object of the invention is the provision of a new and improved machine for trimming a disc which may originally be circular or polygonal in outline, down to a smaller size of polygonal outline.

Such discs in general use are round, that is, circular in outline, and after some use in paint or sheet metal grinding in automobile body repair, wear quickly occurs on approximately the outer edge to a radial depth of three-fourths of an inch. With the loss of the abrasive in this area the disc no longer grinds. By cutting the disc down into a polygonal shape, for example, octagonal, the disc again grinds as new. In fact, the octagonal disc actually does a better job than the original circular disc as it does not leave a ditch on the line of grind and it allows getting in and out better on irregular surfaces.

Another object of the invention is the provision of a machine for the purpose mentioned with adjustable means for positively maintaining the disc while being trimmed in a position for trimming the disc to the desired polygonal shape and size.

The above as well as additional objects will be clarified in the following description, reference being had to the accompanying drawing, wherein reference numerals refer to like-numbered parts on the drawing. It is to be noted that the drawing is intended primarily for the purpose of illustration and that it is therefore neither desired nor intended to limit the invention necessarily to any or all of the details shown or described except in so far as they may be deemed essential to the invention.

Referring briefly to the drawing,

FIG. 1 is a top plan view of the disc trimming machine of the present invention.

FIG. 2 is a front elevational view of the same.

FIG. 3 is a sectional view taken on the line 3—3 of FIG. 1, with the disc turned through one-eighth turn.

FIG. 4 is a top plan view of an octagonal disc which has been trimmed out of a circular disc by the machine.

FIG. 5 is a view illustrating the functioning of the octagonal disc in automobile body repair.

Referring in detail to the drawing, the numeral 10 indicates the supporting frame of the machine and is shown to include an elongated bar 11 and a continuous support wall 12 attached by its ends 13 to the bar 11. The wall 12 includes sections 14, 15 and 16, the section 15 being shown parallel to the bar 11 and the section 16 being shown at an acute angle to the bar. The lower edges of the wall and the bar lie in a common plane so that the machine may be set stably on a table, work bench, or the like.

A plate 17 is shown to cover the space between the top of the wall 12 and the bar 11. The wall 12 and the plate or table top 17 may be provided in one piece, as shown, or the plate may be secured to the wall in any desired manner. Further, instead of providing a continuous wall, the same may be replaced by spaced legs or supports, not shown.

A slot 18 is provided in the plate 17 at right angles to the bar 11. A worm 19 is mounted, in the vertical plane of the slot, directly below the slot and is rotatably supported in the bar 11 and the wall section 15. A rider 20 in the form of an upright spindle is threaded on the worm and projects upward through the slot, and it may have a collar 22 overlapping and slidably engaging the opposed longitudinal edges of the underside of the slot, to further constrain the spindle 21 in vertical position. One end 23 of the worm extends forward beyond the wall section 15 and is provided with any type of crank 24. It is thus apparent that by turning the crank one way or the other the spindle is advanced or retarded in the slot.

The outer edge of the bar 11 is shown shaped into a cutting edge 25. A cutter 26 in the form of an elongated arm provided with a handle 27 at one end, has its other end pivoted at 28 to an upward projection 29 on one end of the bar 11. Thus the two legs of a shears or scissors are provided by the cutter 26 and the bar 11. Shears which function in this manner are well known.

It is now apparent that when a disc 30, which is circular to begin with, is placed on the table 17 with the spindle 21 registering in the hole 31 in the disc, with an edge of the disc overlapping the cutting edge 25 of the bar 11, and the cutter arm is swung down, the latter will shear off a section 30a, FIG. 3, of the disc.

By means of the crank operated worm 19, the disc, when set on the spindle, is moved to the desired position depending upon the radial depth of the piece to be cut off, which, in the case of the example cited above, would be three-fourths of an inch.

A stabilizing guide means is provided whereby, after the first cut has been made in the disc, thereafter all that need be done is to rotate the disc through an arc until the guide means releasably locks the disc in place for the next sequential cut, and so on for subsequent cuts. This means is shown to consist of a spring-loaded U-shaped member 32 having a lower arm 33 and an upper arm 34. A horizontal bracket 35 has one end secured at 36 to the wall 16 and the other end secured at 37 to the bar 11. The arm or section 38 of this bracket, which is shown at substantially right angles to the bar 11, has a hole 39 therethrough, and the wall 16 has a similar hole 40 therethrough. These holes are in a line parallel with the bar 11, and the lower arm 33 of the member 32 is slideably mounted in the holes. On the end of the upper arm 34 of the member 32 is a flat guide plate 41, welded or otherwise secured to the arm at an angle of forty-five degrees on one side and one hundred and thirty-five degrees on the other side of the arm 34 and having its lower edge parallel with and in slidable contact with the plate 17. Thus the plate 41 is at all times parallel with a side of an octagon whose center is in the axis of the spindle 21. The two arms 34 and 32 of course lie in a common vertical plane, and the plate 41 lies in a vertical plane, or at right angles to the top plate 17 of the frame. For the purpose of the invention the bracket 35 may be considered a part of the frame 10.

An expansion spring 42 is mounted on the end of the bar 33 between a cotter pin or other suitable means 43 and the frame member 16, and the spring normally urges the bar 33 and hence the guide plate 41 to the left, against the disc which is mounted on the spindle. As the lower edge of the guide plate 41 is in slidable contact with the top, or table top 17 of the frame, the member 32 is constrained against rotating about the bar 33. At the time the first cut is to be made the plate 41 merely engages the circumferential edge of the disc.

It is now apparent that after the initial piece or section 30a has been cut off the disc, all that need be done to position the disc properly to cut off the next successive piece 30b, is to rotate the disc clockwise, FIG. 1, until the guide plate 41 fully engages the edge 30c resulting from the previously cut off piece 30a. At this position the guide plate will stop rotation of the disc and hold it securely in position for the cutting operation to sever the next successive piece 30b. As the disc is then turned to cut off the third piece, the guide plate is at first pushed outward, to the right, and after it passes the point or apex between the edge 30c and the edge left by cutting off the piece 30b, the spring 42 forces the guide plate back to the left until it fully engages the oncoming edge. This operation is continued until the last piece has been cut off leaving, in the example illustrated, an octagonal disc 44, FIG. 4.

The length of the guide plate 41 is a matter of choice, so long as it has a sufficient length to engage the edge left by cutting off a piece of the disc in the manner set forth.

It is to be recalled that in the case of all equilateral polygons, which of course is what the octagonal disc 44 is, each side of the polygon is bisected by a radius of the circumscribed circle drawn perpendicular to the side. Therefore, if it is desired to cut away a circular disc to the shape of any other polygon of equal sides, it is only necessary to calculate the depth of the first cut for the particular polygon desired, and thereafter succeeding cuts all around the disc will produce the desired polygonal shape. In practice for the purpose intended, however, a polygonal shaped disc of eight sides has been found satisfactory, and to cut a disc down into this shape by means of the present machine takes only ten to twelve seconds.

FIG. 5 illustrates the application of the octagonal abrasive disc when used in an electrical rotary tool 45 in preparing a portion 46 of an automobile body shown fragmentarily at 47. The points or apices of the octagonal circumferential edge of the disc bend back, as shown at 48, and thus wipe the contact area clean without leaving a groove or ditch, particularly near the end of the swath as the disc is returned near the same line. On the other hand, the peripheral portion of the original circular disc resists such bending. In addition, the octagonal shape makes it possible to bend the disc into curved surfaces such as are encountered in automobile bodies.

It is to be noted that the straight edge along which a portion of a circular disc is cut off constitutes a chord of the circle defining the circumferential edge of the disc.

In addition to disc trimming operations such as set forth in the forgoing disclosure, it is obvious that the machine may be used to cut from a circular disc equidistantly spaced portions of equal arcuate length wherein the chords or straight edges remaining on the trimmed disc do not meet in apices. That is, the straight edges of the trimmed disc may be spaced from each other by intervening arcuate segments of the original circumferential edge of the circular disc.

While the invention has been described with particular reference to the accompanying drawing, such is not to be construed as a limitation upon the invention which is best defined in the accompanying claims.

The invention having thus been described, what is claimed and desired to be secured by Letters Patent is as follows:

1. A machine for sequentially cutting off portions of a circular disc along chords of equal length with respect to the circle defining the circumferential edge of the disc wherein the disc has a hole in the center thereof, comprising a shears positioned in a vertical plane, a horizontal plate adjacent to and lying substantially in the plane of the top edge of one leg of the shears, the plate having a slot therein substantially at right angles to said one leg, a support for said plate rigid with the plate, the plate and the support together constituting a rigid frame, means rigidly securing said frame to said one leg, a spindle slidably mounted in said slot, positioning means for advancing or retarding the spindle along said slot, the disc being adapted to be mounted on said plate with said spindle registering in said hole and being adapted to be positioned by said positioning means with a portion of the disc extending between both legs of the shears to have a first chordal cut made therethrough by the shears, the disc being adapted to be rotated in one direction after said first chordal cut has been made to bring the disc into position for the next sequential cut, and means for automatically releasably locking the disc in said position for the next chordal cut by the shears when the disc has been rotated into said last-named position and for similarly automatically releasably locking the disc in each subsequent sequential position for additional chordal cuts upon rotation of the disc in said direction, said last-named means including a vertical guide plate positioned at an angle to said one leg and slidably mounted on said first-named plate, means constraining the guide plate to movement in a straight line toward or away from the disc, resilient means normally urging the guide plate into contact with the circumferential edge of the disc, the automatic releasable locking of the disc in the position for the next chordal cut being achieved by contacting of the guide plate with the edge of the preceding chordal cut.

2. A machine according to claim 1, said constraining means comprising a U-shaped member having one arm thereof positioned above said first-named plate, said frame having a side wall, a bracket secured to said side wall, said bracket and said side wall having aligned holes therethrough, the other arm of said member being slidably mounted in said aligned holes, said guide plate being rigid on the end of said one arm of said member.

3. A machine for trimming a disc having a hole in the center thereof into a polygonal shape by sequentially cutting off portions thereof along chordal lines of equal length, comprising a frame including a horizontal plate having at least one straight side, a straight cutter bar adjacent said straight side having its top edge substantially in the plane of the top surface of said plate, support means secured to the cutter bar for supporting the plate in said horizontal position, said support means including a support portion spaced forward from the cutter bar, the plate having a slot therein substantially at right angles to the cutter bar, a cutter arm pivotally secured at one end thereof to one end of the cutter bar in scissors-like relationship thereto, a worm positioned below and in the plane of said slot and having the ends thereof rotatably supported in the cutter bar and said support portion, a rider threadably mounted on said worm and having a spindle thereon extending upward through said slot, the disc being adapted to be mounted on said plate with said spindle extending through said hole, means for rotating said worm to advance or retard the spindle and hence the disc with respect to the cutter bar, the disc being adapted to be positioned by said means with a portion thereof which lies beyond a predetermined radial distance from the center thereof extending rearward of the cutter bar so that said portion of the disc may be severed by the cutter arm thereby leaving a straight edge on the disc along the line of the severance, a vertical guide plate having its lower edge substantially in slidable contact with said horizontal plate, resilient means normally urging the guide plate into engagement with the circumferential edge of the disc, means constraining the guide plate to linear movement toward or away from the disc, whereby upon rotating the disc in one direction through an arc defined by the length of said cut edge the guide plate registers against said cut edge to position the disc for the next sequential chordal cut.

4. A machine for trimming a disc having a hole therein and which has had a portion of the edge thereof removed along a straight line thereby leaving a straight edge portion on the disc, comprising a frame including a horizontal plate having at least one straight side, a cutter bar adjacent said straight side of the plate having its top edge substantially in the plane of the top surface of the plate, support means secured to the plate and the cutter bar for supporting the plate in horizontal position, the support means including a first support portion spaced forward from the cutter bar, the plate having a slot therein substantially at right angles to the cutter bar, a cutter arm pivotally secured to the cutter bar in scissors-like relationship thereto, a worm positioned below and in the plane of said slot and having the ends thereof rotatably mounted in the cutter bar and said first support portion, a rider threaded on the worm and having a spindle thereon extending upward through said slot, said support means including a second support portion, the frame including a rigid member spaced from said second support portion, said member and said second support portion having aligned passages therethrough positioned in a line parallel with said cutter bar, a U-shaped member lying in a vertical plane and including a lower arm slidably mounted in said aligned passages and an upper arm extending above said plate, said upper arm having a vertical guide plate on the end thereof at a given angle to said vertical plane, the lower edge of the guide plate being horizontal and slidably engaging said horizontal plate, resilient means normally urging the U-shaped member inward with respect to the frame and hence normally urging the guide plate into engagement with the circumferential edge of the disc whereby when the disc is positioned with said straight edge thereon adjacent to the guide plate and at said given angle to said vertical plane the guide plate engages the straight edge on the disc and releasably locks the disc against rotation so that a second portion of the disc of the same dimensions as said first-named portion thereof will be in a position to be severed by the cutter arm.

5. A machine according to claim 4, said resilient means comprising a coiled spring surrounding the portion of the lower arm which extends into the frame beyond said second support portion, stop means on the extremity of said portion of the lower arm thereby positioning the spring between the stop means and said second support portion.

6. A machine for sequentially cutting off portions of a circular disc along chords of equal length wherein the disc has a hole in the center thereof, comprising a shears positioned in a vertical plane, a horizontal plate adjacent to and lying in the plane of the top edge of one leg of the shears, the plate having a slot therein substantially at right angles to said one leg, a support for said plate rigid with the plate, the plate and the support together constituting a rigid frame, means rigidly securing said frame to said one leg, a spindle slidably mounted in said slot, means for advancing or retarding the spindle along said slot, the disc being adapted to be mounted on said plate with said spindle registering in said hole and being adapted to be positioned by said last-named means with a portion of the disc extending between both legs of the shears to have a first chordal cut made therethrough by the shears, the disc being adapted to be rotated in one direction after said first chordal cut has been made to bring the disc into position for the next sequential cut, means for automatically releasably locking the disc in said position for the next chordal cut by the shears when the disc has been rotated into said last-named position and for similarly automatically releasably locking the disc in each subsequent sequential position for additional chordal cuts upon rotation of the disc in said direction, a member extending forward from said one leg and rigidly secured thereto and spaced from said frame, said support including a support portion on the same side of said frame as said member, said member and said support portion having aligned passages therethrough in a line parallel with said one leg, said last-named means comprising a U-shaped member lying in a vertical plane and including an upper arm and a lower arm slidably mounted in said passages, said upper arm extending over said plate and having a vertical guide plate on the end thereof at a given angle to said vertical plane, the lower edge of the guide plate being horizontal and slidably engaging said horizontal plate, and resilient means normally urging said U-shaped member inward into said frame and hence normally urging said guide plate into engagement with the circumferential edge of the disc whereby when the disc has been rotated into a position wherein the straight edge thereon which results from said first chordal cut is at said angle to said vertical plane the guide plate engages the first chordal edge.

References Cited in the file of this patent

UNITED STATES PATENTS

| | | |
|---|---|---|
| 714,227 | Notman | Nov. 25, 1902 |
| 2,207,024 | Prince | July 9, 1940 |
| 2,227,575 | Eliel | Jan. 7, 1941 |
| 2,783,840 | Snorek | March 5, 1957 |

FOREIGN PATENTS

| | | |
|---|---|---|
| 533,132 | France | Feb. 22, 1922 |
| 68,615 | Germany | May 10, 1893 |
| 137,018 | Germany | Dec. 12, 1902 |